(12) United States Patent
Hairston (10) Patent No.: US 12,106,276 B2
(45) Date of Patent: Oct. 1, 2024

(54) METHODS AND SYSTEMS FOR INTELLIGENT ELECTRONIC INVENTORY MANAGEMENT

(71) Applicant: Wayne Fueling Systems LLC, Austin, TX (US)

(72) Inventor: Hob Hairston, Cedar Park, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 289 days.

(21) Appl. No.: 17/660,790

(22) Filed: Apr. 26, 2022

(65) Prior Publication Data

US 2022/0343267 A1    Oct. 27, 2022

Related U.S. Application Data

(60) Provisional application No. 63/251,965, filed on Oct. 4, 2021, provisional application No. 63/180,611, filed on Apr. 27, 2021.

(51) Int. Cl.

| | |
|---|---|
| G06Q 20/00 | (2012.01) |
| B67D 7/04 | (2010.01) |
| B67D 7/08 | (2010.01) |
| G06Q 10/087 | (2023.01) |
| G06Q 20/20 | (2012.01) |
| G06Q 30/0201 | (2023.01) |

(Continued)

(52) U.S. Cl.
CPC ........... *G06Q 20/20* (2013.01); *B67D 7/04* (2013.01); *B67D 7/08* (2013.01); *G06Q 10/087* (2013.01); *G06Q 30/0201* (2013.01); *G06Q 50/06* (2013.01); *H04W 4/80* (2018.02); *B67D 2007/044* (2013.01)

(58) Field of Classification Search
USPC .............................. 382/103; 705/40; 700/236
See application file for complete search history.

(56) References Cited

U.S. PATENT DOCUMENTS

| | | | | |
|---|---|---|---|---|
| 6,070,156 | A | * | 5/2000 | Hartsell, Jr. ........... G07C 5/008 705/413 |
| 6,098,879 | A | * | 8/2000 | Terranova ............. G07F 7/1008 235/380 |

(Continued)

OTHER PUBLICATIONS

Pramono, Ari. Modelling the behavior of fuel retail consumers. Diss. Monash University, 2013. (Year: 2013).*

(Continued)

*Primary Examiner* — Gurkanwaljit Singh
(74) *Attorney, Agent, or Firm* — Mintz, Levin, Cohn, Ferris, Glovsky and Popeo, P.C.

(57) ABSTRACT

In one aspect, first data characterizing an attribute of a fuel dispenser user interacting with a fuel dispenser can be received. A first product that is associated with the fuel dispenser user can be determined based on the received first data. Second data characterizing a first location at a fueling station can be received. Third data that characterizes whether the first product is stored at the first location can be determined based on the determined first product and the received second data. A first command can be determined based on the determined third data. The command can be transmitted. Related apparatus, systems, methods, techniques, and articles are also described.

17 Claims, 5 Drawing Sheets

(51) Int. Cl.
*G06Q 50/06* (2012.01)
*H04W 4/80* (2018.01)

(56) References Cited

U.S. PATENT DOCUMENTS

| | | | | |
|---|---|---|---|---|
| 6,882,900 | B1* | 4/2005 | Terranova | B67D 7/08 |
| | | | | 700/242 |
| 9,424,566 | B2* | 8/2016 | Berrio | G06Q 20/202 |
| 10,108,943 | B2* | 10/2018 | Harrell | G06Q 20/12 |
| 10,269,082 | B2* | 4/2019 | Morris | G06Q 30/0601 |
| 10,577,237 | B2* | 3/2020 | Fieglein | G06Q 20/20 |
| 11,741,556 | B2* | 8/2023 | Morris | G06Q 30/0251 |
| | | | | 382/103 |
| 2002/0116261 | A1* | 8/2002 | Moskowitz | G06Q 20/102 |
| | | | | 705/40 |
| 2004/0204999 | A1* | 10/2004 | Negley, III | G06Q 20/12 |
| | | | | 705/16 |
| 2005/0261916 | A1* | 11/2005 | McCall | G06Q 30/0601 |
| | | | | 705/17 |
| 2006/0271431 | A1* | 11/2006 | Wehr | G06Q 30/0226 |
| | | | | 705/14.65 |
| 2014/0279294 | A1* | 9/2014 | Field-Darragh | H04B 5/77 |
| | | | | 705/28 |
| 2015/0106196 | A1* | 4/2015 | Williams | G06Q 30/0253 |
| | | | | 705/14.51 |
| 2018/0105412 | A1* | 4/2018 | Fieglein | B67D 7/04 |
| 2019/0177152 | A1* | 6/2019 | Fieglein | B67D 7/62 |

OTHER PUBLICATIONS

Willems, Kim, et al. "The path-to-purchase is paved with digital opportunities: An inventory of shopper-oriented retail technologies." Technological Forecasting and Social Change 124 (2017): 228-242. (Year: 2017).*

Castro, Daniel, Robert D. Atkinson, and Stephen J. Ezell. "Embracing the self-service economy." Available at SSRN 1590982 (2010). (Year: 2010).*

International Search Report and Written Opinion received for PCT Patent International Application No. PCT/US2022/071921, mailed on Aug. 3, 2022, 12 pages.

\* cited by examiner

METHODS AND SYSTEMS FOR INTELLIGENT ELECTRONIC INVENTORY MANAGEMENT

CROSS-REFERENCE TO RELATED APPLICATIONS

This application claims priority to U.S. Provisional Application No. 63/180,611 filed on Apr. 27, 2021, and to U.S. Provisional Application No. 63/251,965 filed on Oct. 4, 2021, the entire contents of each of which are hereby expressly incorporated by reference herein.

FIELD

The current subject matter relates to methods and systems for intelligent electronic inventory management.

BACKGROUND

A large problem in convenience retail is ensuring products are stocked on shelves and in coolers when customers shop. Store systems may track inventory and notify the operator of shortages, but this does not necessarily ensure the product is available to buy because it may be in storage on not on the shelf or in the cooler. Further, even if intelligent systems, such as computer vision and planograms are used to replenish missing products in the shop, these systems are not linked to individual consumers or their buying habits.

SUMMARY

Methods and systems for intelligent electronic inventory management are provided. Related apparatus, systems, techniques, and articles are also described.

In one aspect, first data characterizing an attribute of a fuel dispenser user interacting with a fuel dispenser can be received. A first product that is associated with the fuel dispenser user can be determined based on the received first data. Second data characterizing a first location at a fueling station can be received. Third data that characterizes whether the first product is stored at the first location can be determined based on the determined first product and the received second data. A first command can be determined based on the determined third data. The command can be transmitted.

One or more of the following features can be included in any feasible combination. For example, the first product can be determined using a first predictive model that predicts the association of the first product with the fuel dispenser user based on the attribute of the fuel dispenser user. For example, the attribute of the fuel dispenser user characterized by the first data can include a history of products purchased by the fuel dispenser user, the history of products including the first product. For example, the second data can include image data that characterizes an image of the first location, and determining of the third data can include determining, from the image data, whether the first product is stored at the first location. For example, the second data can include sensor data characterizing one or more products stored at the first location, and the determining of the third data can include determining, from the sensor data, whether the first product is included in the one or more products stored at the first location. For example, the third data can indicate that the first product is stored at the first location, a first communication that characterizes a second product having a complementary association with the first product can be determined based on the transmitted first command, and the first communication can be provided to the fuel dispenser for presentation on a graphical display of the fuel dispenser. For example, the first communication can be provided to a mobile device of the fuel dispenser user for presentation on an interactive display of the mobile device. For example, the third data can indicate that the first product is not stored at the first location, fourth data characterizing a second location at the fueling station can be received, fifth data characterizing whether the first product is stored at the second location can be determined based on the transmitted first command, the first product, and the received fourth data, a second command can be determined based on the determined fifth data, and the second command can be transmitted. For example, the fifth data can indicate that the first product is stored at the second location, a notification characterizing a recommendation to relocate the first product from the second location to the first location can be determined based on the transmitted second command, and the notification can be provided a point-of-sale terminal at the fueling station for presentation on a display thereof. For example, the notification can be provided to a mobile device of a fueling station attendant for presentation on a display thereof. For example, the fifth data can indicate that the product is not stored at the second location, a second communication characterizing a third product, the third being an alternative product to the first product, can be determined based on the transmitted second command, and the second communication can be provided to the fuel dispenser for presentation on a graphical display of the fuel dispenser. For example, the second communication can be provided to a mobile device of the fuel dispenser user for communication on an interactive display of the mobile device.

In another aspect, a system is provided and can include at least one data processor and memory storing instructions configured to cause the at least one data processor to perform operations described herein. The operations can include receiving first data characterizing an attribute of a fuel dispenser user interacting with a fuel dispenser; determining, based on the received first data, a first product that is associated with the fuel dispenser user; receiving second data characterizing a first location at a fueling station; determining, based on the determined first product and the received second data, third data that characterizes whether the first product is stored at the first location; determining a first command based on the determined third data; and transmitting the first command.

One or more of the following features can be included in any feasible combination. For example, the first product can be determined using a first predictive model that predicts the association of the first product with the fuel dispenser user based on the attribute of the fuel dispenser user. For example, the attribute of the fuel dispenser user characterized by the first data can include a history of products purchased by the fuel dispenser user, the history of products including the first product. For example, the third data can indicate that the first product is stored at the first location, and the operations can include determining a first communication, based on the transmitted first command, that characterizes a second product, the second product having a complementary association with the first product; and providing the first communication to the fuel dispenser for presentation on a graphical display of the fuel dispenser. For example, the third data can indicate that the first product is not stored at the first location, and the operations can include receiving fourth data characterizing a second location at the fueling station; determining, based on the transmitted first command, the first product, and the received fourth data, fifth data that characterizes whether the first product is stored at the second location; determining a second command based on the determined fifth data; and transmitting the second command. For example, the fifth data can indicate that the first product is not stored at the second location, and the operations can further include determining a second communication, based on the transmitted second command, that characterizes a third product, the third product being an alternative product to the first product; and providing the second communication to the fuel dispenser for presentation on a graphical display of the fuel dispenser.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, methods and systems for intelligent electronic inventory management are provided. A system incorporating some implementations of the current subject matter can include a server that analyzes attributes of a fuel dispenser user acquired from a fuel dispenser and/or the mobile device of the fuel dispenser user while the fuel dispenser is engaged in a fueling transaction at the fuel dispenser, in conjunction with historical data characterizing products of interest to the fuel dispenser user, to determine one or more products of interest to the fuel dispenser user that are typically available for sale at a store of the fueling station. The server can determine, from data characterizing the store and while the fueling transaction is in progress, whether the one or more products of interest are readily in stock in the store and available for the fuel dispenser user to purchase. If the server determines the one or more products of interest are not in stock, the server can determine whether the one or more products of interest are located on-site and available to be put in stock in the store. If the one or more products of interest are not located on-site and are not in stock, the server can generate a personalized communication, for providing to the fuel dispenser user via the fuel dispenser and/or the mobile device of the fuel dispenser user, characterizing an alternative product that is likely to be of interest to the fuel dispenser user. If the one or more products of interest are located on-site but are not in stock in the store, the server can generate and provide a notification that contains a recommendation to move the one or more products of interest to be in stock in the store. And, if the one or more products of interest are located on-site or are located in the store, the server can generate a personalized communication, for providing to the fuel dispenser user via the fuel dispenser and/or the mobile device of the fuel dispenser user, characterizing a product that complements the one or more products of interest. Such an approach can allow for enhanced management of inventory and an improved customer experience for the fuel dispenser user. In addition, some implementations of the current subject matter described herein can enable improved inventory management by determining recommendations of the goods and/or services presented in the storefront based on electronically-acquired data that characterizes a fueling station customer and by analyzing the electronically-acquired data using predictive modeling techniques to determine goods and/or services of interest to the fueling station customer.

Figure 1:
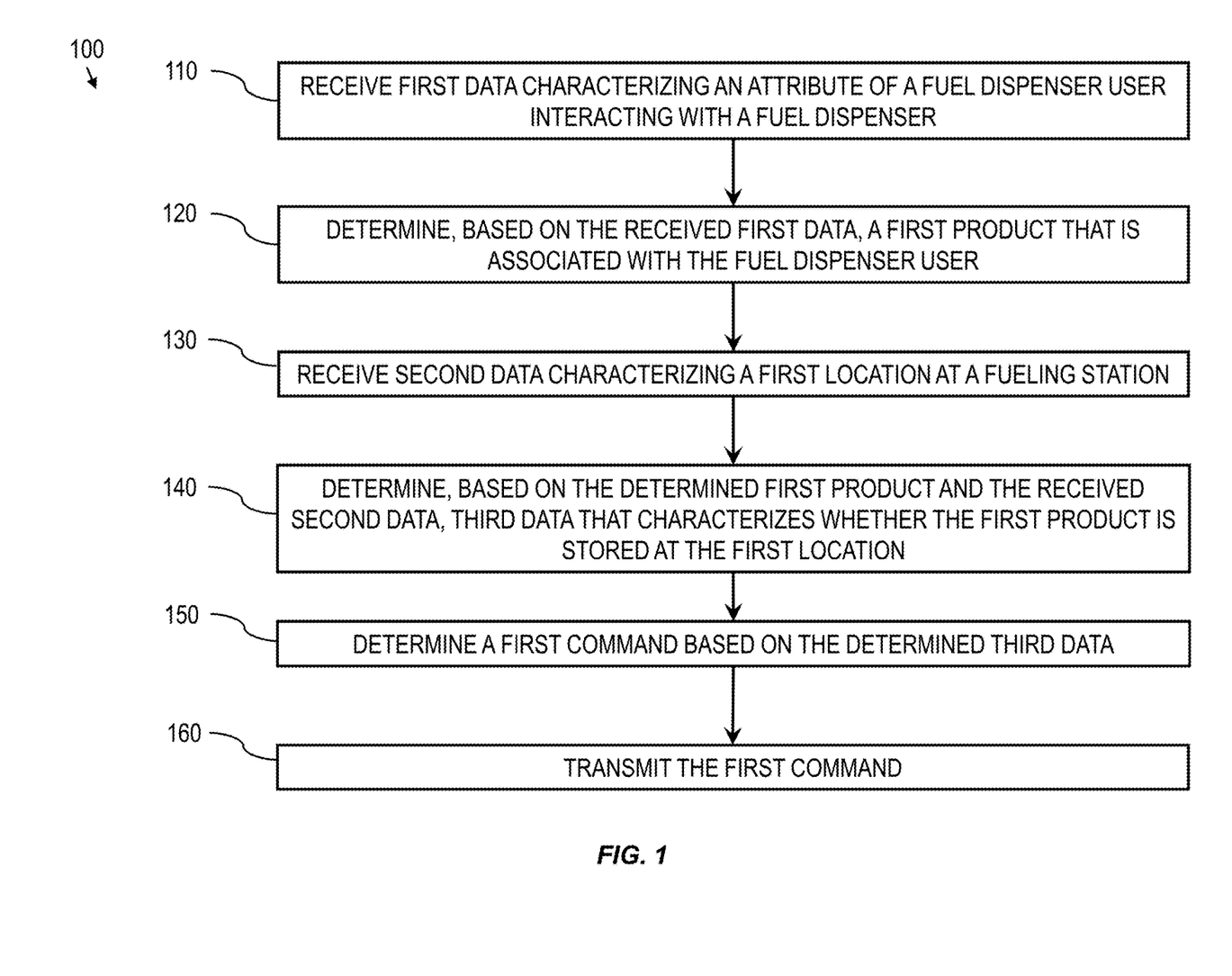
FIG. 1 is a process flow diagram illustrating an example process of some implementations of the current subject matter that can provide for intelligent electronic inventory management.
Figure 2:
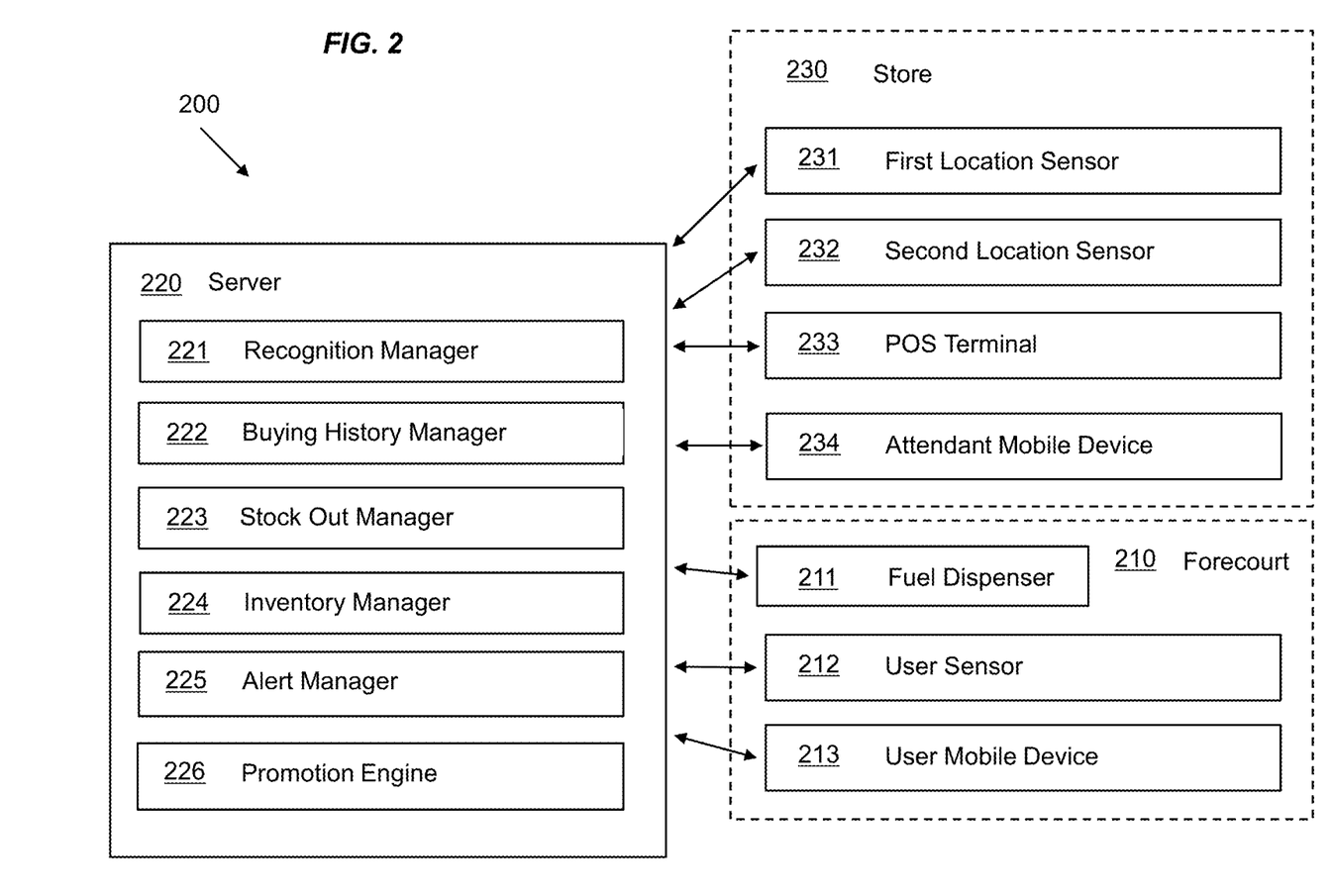
FIG. 2 is a system diagram illustrating an example system of some implementations of the current subject matter that can provide for intelligent electronic inventory management.

FIG. 1 is a process flow diagram illustrating an example process 100 of some implementations of the current subject matter that can provide for intelligent electronic inventory management, and FIG. 2 is a system diagram illustrating an example system 200 that incorporates some implementations of the current subject matter and that can provide for the same.

As shown in FIG. 2, the system 200 includes a fuel dispenser 211 that is disposed in a fueling forecourt 210 of a fueling station and configured to dispense fuel to a user of the fuel dispenser 211. The fuel dispenser 211 can include at least one data processor configured to perform one or more aspects of the functionality described herein, and memory for storing instructions for performing one or more aspects of the functionality described herein. The fuel dispenser 211 can also include an interactive display that is in operable communication with the at least one data processor and that is configured to present electronic media to the fuel dispenser user.

In some implementations, the system 200 can also include a user sensor 212 that is configured to acquire data characterizing the fuel dispenser user. For example, in some implementations, the user sensor 212 can include an image sensor that is configured to acquire an image of the fuel dispenser user and/or a vehicle of the fuel dispenser user. For example, in some implementations, the user sensor 212 can include an electronic emissions sensor that is configured to acquire wireless electronic emissions from an electronic device of the fuel dispenser user (e.g., mobile device, wearable device, etc.). In some implementations, the user sensor 212 is integrated into the fuel dispenser 211 and is in operable communication with one or more components of the fuel dispenser 211 (e.g., the at least one data processor of the fuel dispenser 211).

In some implementations, as shown in FIG. 2, the system 200 can include a mobile device 213 of the fuel dispenser user. The mobile device 213 can include at least one data processor configured to perform one or more aspects of the functionality described herein, and memory for storing instructions for performing one or more aspects of the functionality described herein. The mobile device 213 can also include a screen that is in operable communication with the at least one data processor and that is configured to present electronic media to the fuel dispenser user. In some implementations, the mobile device 213 can be in operable communication with the fuel dispenser 211.

As shown in FIG. 2, in some implementations, the system 200 can include a server 220 that is configured to perform operations that can enable one or more aspects of the intelligent electronic inventory management described herein. The server 220 can include at least one data processor configured to perform one or more aspects of the functionality described herein, and memory for storing instructions for performing one or more aspects of the functionality described herein. As shown, the server 220 can be in operable communication with the fuel dispenser 211, the user sensor 212, and/or the user mobile device 213. In some implementations, the server 220 can also be in operable communication with one or more components present at a store 230 that is located at the fueling station and provides additional goods and/or services beyond fuel, such as a first location sensor 231 that is configured to acquire and/or determine data characterizing a first location of the store 230 (e.g., a floor of the store 230 where products are placed on shelves for purchase by a fuel dispenser user, a refrigerator at the store 230 where products needing refrigeration are stored for purchase by a fuel dispenser user, etc.). In some implementations, the first location sensor 231 can be configured to sense a presence of one or more products located at the first location. In some implementations, the first location sensor 231 can acquire image data characterizing the first location.

In some implementations, the server 220 can also be in operable communication with a second location sensor 231 that is configured to acquire and/or determine data characterizing a second location of the store 230, such as an inventory store room that stores the one or more products and that is not generally accessible to a fuel dispenser wishing to purchase an item at the store 230. In some implementations, the second location sensor 232 can be configured to sense a presence of one or more products located at the second location. In some implementations, the first location sensor 232 can acquire image data characterizing the second location.

In some implementations, the server 220 can also be in operable communication with a point-of-sale ("POS") terminal 233 present in the store 230. The POS terminal 233 can include a display that is configured to provide messages to a fueling station attendant characterizing the presence of the one or more products at the second location. In some implementations, the server 220 can also be in operable communication with a mobile device 234 of the fueling station attendant, which can similarly have a display configured to similarly provide the messages characterizing the presence of the one or more products at the second location.

As explained in further detail below, the server 220 can include several functions one or more aspects of the subject matter described herein using the at least one data processor. For example, in some implementations, the server 220 can include a recognition manager 221 that is configured to identify the fuel dispenser user that is engaging the fuel dispenser 211 for a fueling transaction. For example, in some implementations, the server 220 can include a buying history manager 222 that is configured to determine a history of products purchased by the fuel dispenser user and/or predict a product of interest to the fuel dispenser user. For example, in some implementations, the server 220 can include a stock out manager 223 that is configured to determine, from data characterizing the above-described first location of the store 230 and the determined history of products and/or predicted product of interest, whether a product of the history of products and/or the predicted product of interest is present at the first location of the store 230 and available to the fuel dispenser user for purchase.

For example, in some implementations, the server 220 can include an inventory manager 224 that, in the event the product of the history of products and/or the predicted product of interest is determined to be not present on the floor of the store 230 by the stock out manager 223, is configured to determine whether the product of the history of products and/or the predicted product of interest is present in an inventory store room of the store 230 that is inaccessible to the fuel dispenser user. For example, in some implementations, the server 220 can include an alert manager 225 that, in the event the product of the history of products and/or the predicted product of interest is not present on the floor of the store 230, but is present in the inventory store room of the store 230, to generate a notification characterizing an instruction to move the product from the inventory store room to the floor such that the product is made available to the fuel dispenser user for purchase prior to their departure from the fueling station. In some implementations, the alert manager 225 can be configured to transmit the notification to the POS terminal 233 of the store 230 such that a visual alert can be provided to a fueling station attendant (via the display of the POS terminal) that indicates the product should be moved from the inventory store room to the floor. For example, in some implementations, as described in further detail below, the server 220 can include a promotion engine 226 that is configured to generate a personalized communication (e.g., graphical media characterizing an advertisement or promotion) that characterizes the product of the history of products, the predicted product of interest, a complementary product that has a complementary association with the product/predicted product of interest, and/or an alternative product that is an alternative to the product and/or predicted product of interest, and that is predicted to be of interest to the fuel dispenser user based on the product and/or predicted product of interest. In some implementations, the promotion engine 226 can also provide the generated personalized communication to the fuel dispenser 211 for depiction on the interactive display of the fuel dispenser 211. In some implementations, the promotion engine 226 can also provide the generated personalized communication to the user mobile device 213 for depiction on the screen of the mobile device 213.

With reference to FIGS. 1 and 2, at 110, first data characterizing an attribute of a fuel dispenser user interacting with a fuel dispenser, such as fuel dispenser 211, can be received. In some implementations, the first data can be received by the server 220. And, in some implementations, the first data can be received by the recognition manager 221 of the server 220.

For example, in some implementations, the first data can include information about the fuel dispenser user that can be used to identify the fuel dispenser user and/or characteristics of the fuel dispenser user. For example, in some implementations, the first data can include image data acquired by the user sensor 212 that characterizes an image of the fuel dispenser user and/or the vehicle of the fuel dispenser user, and the identity of the fuel dispenser user can be determined by the recognition manager 221 from the acquired image data using conventional image techniques (e.g., facial recognition, vehicle license plate number detection, and the like). In some implementations, the recognition manager 221 can determine one or more demographic features of the fuel dispenser user (e.g., age, weight, height, disability status, and the like.) In some implementations, the first data can include wireless emissions data acquired by the user sensor 212 that characterizes the wireless emissions of one or more devices associated with the fuel dispenser user (e.g., mobile device, wearable device, etc.), and the identity of the fuel dispenser user can be determined by the recognition manager 221 from the acquired wireless emissions data present in the first data.

For example, in some implementations, the first data can include identity information characterizing the fuel dispenser user that is acquired during the fuel dispenser user's interactions with the fuel dispenser 211. For example, the fuel dispenser 211 can include a card reader that is configured to acquire identity information encoded on a card (e.g., loyalty card, credit card, and the like) of the fuel dispenser user that is inserted by the fuel dispenser user into the card reader, and the fuel dispenser can include the acquired identity information in the first data.

At 120, a first product that is associated with the fuel dispenser user can be determined based on the received first data. The first product can be a good and/or service that is available for purchase at the fueling station (e.g., food/drinks, convenience store item, car wash services, air compressor use, etc.) For example, in some implementations, attribute data characterizing one or more attributes of the fuel dispenser user (e.g., the identity and/or the demographic information of the fuel dispenser user) can be determined by the recognition manager 221 of the server 220 based on the received first data. The attribute data can be provided to the buying history manager 222.

In some implementations, the buying history manager 222 can determine, using the received attribute data, a history of product purchases made by the fuel dispenser user that includes the first product. The history of product purchases can be maintained by the server 220, or, in some implementations, the history of product purchases can be retrieved from one or more remote databases that are external to the server 220.

In some implementations, the recognition manager 221 can use the received attribute data to determine the first product using a first predictive model, which can predict that there is a high likelihood that the fuel dispenser user will be interested in a particular product that is typically available for purchase at the fueling station and select the particular product as the first product. For example, in some implementations, the first predictive model can analyze the attribute data and determine whether one or more attributes of the fuel dispenser user characterized by the attribute data is substantially correlated with a model attribute present in the first predictive model that is associated with a particular product. As such, the first predictive model can predict that there is a high likelihood that the fuel dispenser user 210 will have an interest in the particular product, and, based on the particular product outputted by the first predictive model, the buying history manager 222 can designate the particular product as the first product.

In some implementations, the determined first product can be a plurality of first products having the characteristics described above and determined in accordance with the techniques described above. The determined first product can be provided to the stock out manager 223, which can analyze the determined first product as described in detail below.

At 130, second data characterizing a first location at the fueling station can be received. For example, in some implementations, the second data can include image data, acquired by the first location sensor 231, that characterizes an image of the above-described first location. In some implementations, the second data can include product data, acquired by the first location sensor 231, that characterizes a listing of products present at the first location. The second data can be received by the stock out manager 223, which can analyze the received second data as described in detail below.

At 140, third data characterizing whether the first product is stored at the first location can be determined based on the determined first product and the received second data. For example, in some implementations, the stock out manager 223, upon receiving the determined first product, can compare the determined first product against the received second data and determine, based on the second data, whether the first product is present at the first location. For example, in some implementations, wherein the second data includes image data characterizing an image of the first location, the stock out manager 223 can identify various items that are present at the first location using conventional image recognition techniques (e.g., computer vision, etc.) and determine whether the first product is present at the first location. The third data, which characterizes that determination, then can be determined by the stock out manager 223. For example, in some implementations, the third data can characterize an indication that the first product is stored at the first location. For example, in some implementations, the third data can characterize an indication that the first product is not stored at the first location.

At 150, a first command can be determined based on the determined third data, and, at 160, the first command can be transmitted. For example, in some implementations, the first command can be determined by the stock out manager 223, and the first command include an instruction for one or more of the managers/engines 221-226 of the server 220 to execute an operation using the at least one data processor of the server 220.

For example, in some implementations, wherein the third data indicates that the first product is stored at the first location, the stock out manager 223 can generate a command that is configured to cause the generation, by the promotion engine 226, of a personalized communication characterizing a second product that is complementary to the first product. In some implementations, the promotion engine 226 can use the received attribute data and the determined first product to determine the first communication using a second predictive model, which can predict that there is a high likelihood that the fuel dispenser user will be interested in a complementary product that is typically available for purchase at the fueling station and is a complement to the first product. For example, in some implementations, the second predictive model can analyze the attribute data and the determined first product and determine whether one or more attributes of the fuel dispenser user characterized by the attribute data and the determined first product are substantially correlated with a model attribute present in the second predictive model that is associated with a complementary product. As such, the second predictive model can predict that there is a high likelihood that the fuel dispenser user will have an interest in the complementary product, and, based on the complementary product outputted by the second predictive model, the promotion engine 226 can determine the personalized communication such that it characterizes the resultant complementary product. In some implementations, the promotion engine 226 can provide the personalized communication to the fuel dispenser 211 for presentation on the interactive display of the fuel dispenser 211. In some implementations, the promotion engine 226 can provide the personalized communication to the mobile device 213 of the fuel dispenser user for presentation on the screen of the mobile device 213.

For example, in some implementation, wherein the third data indicates that the first product is not present at the first location, the stock out manager 223 can generate a command indicating that the first product is not present at the first location and then transmit the generated command to the inventory manager 224 for further analysis as described below.

In some implementations, the inventory manager 224 can receive fourth data that characterizes the second location and that can be used by the inventory manager 224 to determine whether the first product is present at the second location. For example, in some implementations, the second data can include image data, acquired by the second location sensor 232, that characterizes an image of the above-described second location. In some implementations, the second data can include product data, acquired by the second location sensor 232, that characterizes a listing of products present at the second location.

As referenced above, in some implementations, the inventory manager 224 can, based on the received command, the fourth data characterizing the second location, and the determined first product to determine whether the first product is present at the second location. For example, in some implementations, the inventory manager 224 can compare the determined first product against the received fourth data and determine, based on the fourth data, whether the second product is present at the second location. For example, in some implementations, wherein the second data includes image data characterizing an image of the second location, the inventory manager 224 can identify various items that are present at the second location using conventional image recognition techniques (e.g., computer vision, etc.) and determine whether the first product is present at the second location.

In some implementations, the inventory manager 224 can determine fifth data characterizing that determination. For example, in some implementations, the fifth data can characterize an indication that the first product is stored at the second location. For example, in some implementations, the fifth data can characterize an indication that the first product is not stored at the second location.

In some implementations, a command can be determined based on the determined fifth data, and the command can be transmitted for further analysis and processing as described elsewhere herein. For example, in some implementations, the command can be determined by the inventory manager 224, and the command include an instruction for one or more of the mangers/engines 221-226 of the server 220 to execute an operation using the at least one data processor of the server 220.

For example, in some implementations, wherein the fifth data indicates that the first product is present at the second location, the inventory manager 224 can generate a command that is configured to cause the generation, by the alert manager 225, of a notification that indicates that the first product is located at the second location and not at the first location, and that the first product should be moved to the first location such that it is available for purchase by the fuel dispenser user. In some implementations, the alert manager 225 can generate the notification characterizing that indication and then provide the notification to the POS terminal 233 for presentation on a display thereof to a fueling station attendant. In some implementations, the alert manager 225 can generate the notification characterizing that indication and then provide the notification to the mobile device 234 of the fueling station attendant for presentation on a display thereof. And, in some implementations, wherein the fifth data indicates that the first product is present at the second location, the inventory manager 224 can generate a command that is configured to cause the generation, by the promotion engine 226, of a personalized communication characterizing the second product that is complementary to the first product using the techniques and methods described above.

In some implementations, wherein the fifth data indicates that the first product is not present at the second location, and wherein the third data indicates that the first product is not present at the first location, the attribute data, the determined product, the third data, and the fifth data can be provided to the promotion engine 226. In some implementations, the promotion engine 226 can use the received attribute data, the determined first product, the third data, and the fifth data to determine a personalized communication using a third predictive model, which can predict that there is a high likelihood that the fuel dispenser user will be interested in an alternative product that is typically available for purchase at the fueling station and is a suitable alternative to the first product in which the fuel dispenser user is interested.

For example, in some implementations, the third predictive model can analyze the attribute data and the determined first product to determine whether one or more attributes of the fuel dispenser user characterized by the attribute data and the determined first product are substantially correlated with a model attribute present in the third predictive model that is associated with the alternative product. As such, the third predictive model can predict that there is a high likelihood that the fuel dispenser user will have an interest in the alternative product, and, based on the alternative product outputted by the third predictive model, the promotion engine 226 can determine the personalized communication such that it characterizes the resultant alternative product. In some implementations, the promotion engine 226 can provide the personalized communication to the fuel dispenser 211 for presentation on the interactive display of the fuel dispenser 211. In some implementations, the promotion engine 226 can provide the personalized communication to the mobile device 213 of the fuel dispenser user for presentation on the screen of the mobile device 213.

Figure 3:
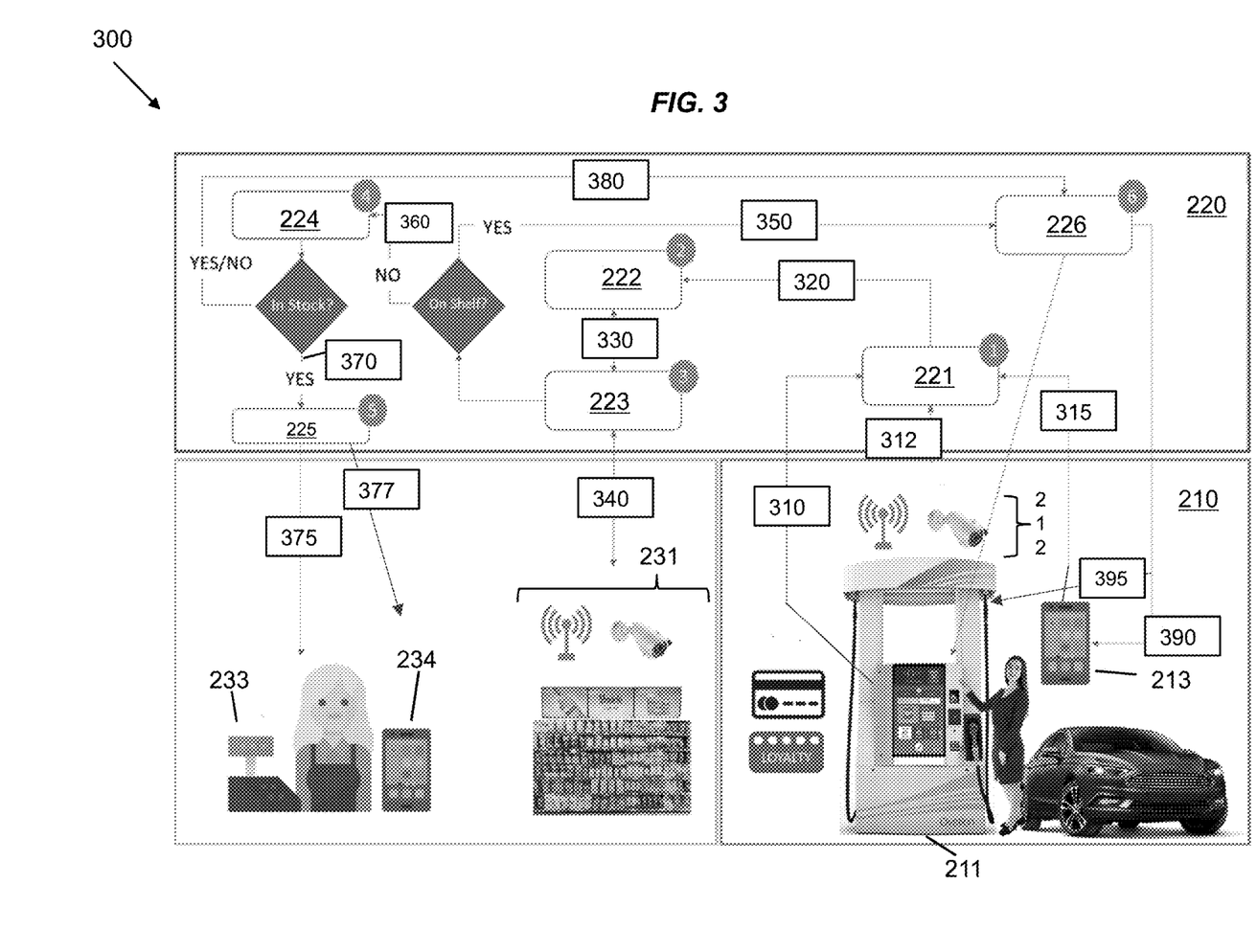
FIG. 3 is a data flow diagram illustrating the transfer of data between one or more of the system components illustrated in FIG. 2.

FIG. 3 is a data flow diagram 300 illustrating the transfer of one or more of the types of data described herein between one or more of the system components illustrated in FIG. 2 and in accordance with some implementations of the current subject matter.

With reference to FIGS. 2 and 3, in some implementations, a fuel dispenser user can begin a fueling transaction with a fuel dispenser 211. In interacting with the fuel dispenser 211, the user sensor 212 can acquire data characterizing the fuel dispenser user, and the fuel dispenser 211 can similarly acquire data characterizing the fuel dispenser user. The fuel dispenser 211 can, at 310, provide the acquired data characterizing the fuel dispenser user to the recognition manager 221. In some implementations, the user sensor 212 can, at 312, provide the acquired data characterizing the fuel dispenser user to the recognition manager 221. In some implementations, the mobile device 213 of the fuel dispenser user 211 can provide data characterizing the fuel dispenser user to the recognition manager 221.

In some implementations, the recognition manager 221 can, based on the data received from the fuel dispenser 211, the user sensor 212, and/or the mobile device 213 of the fuel dispenser user, determine attribute data that characterizes the fuel dispenser user. At 320, the recognition manager 221 can provide the determined attribute data to the buying history manager 222. The buying history manager 222 can determine the history of products purchased by the fuel dispenser user and/or predict a product of interest to the fuel dispenser user based on the received attribute data.

In some implementations, the buying history manager 222 can determine a first product based on the determined history of products and/or predicted product of interest, and, at 330, the buying history manager 222 can provide the determined first product to the stock out manager 223. The stock out manager 223 can, at 340, receive first data characterizing the first location from the first location sensor 231 and determine from the received first data whether the determined first product is present at the first location. In response to determining that the first product is present at the first location, the stock out manager 223 can generate an instruction to cause the promotion engine 226 to generate a personalized communication that characterizes a product that complements the first product. And, at 350, the stock out manager 223 can provide the instruction to the promotion engine 226.

In some implementations, in response to determining that the first product is not present at the first location, the stock out manager 223 can generate an instruction for the inventory manager 224 to determine whether the first product is present at the second location, and, at 360, the stock out manager 223 can provide that instruction to the inventory manager 224. In response to receiving the instruction, the inventory manager 224 can determine, from fourth data received from the second location sensor 232 and characterizing the second location, whether the first product is present at the second location.

In response to determining that the first product is present at the second location, the inventory manager 224 can generate data characterizing that determination and, at 370, the inventory manager 224 can provide that data to the alert manager 225. The alert manager 225 can, based on the received data, generate a notification indicating that the first product is at the second location and should be moved to the first location, and, at 375, the alert manager 225 can provide the notification to the POS terminal 233 for presentation on a display thereof to the fueling station attendant. And, at 377, the alert manager 225 can provide the notification to the mobile device 234 of the fueling station attendant for presentation on a display thereof to the fueling station attendant.

In response to determining that the first product is not present at the second location, the inventory manager 224 can generate an instruction to cause the promotion engine 226 to generate a personalized communication that characterizes a product that is an alternative to the first product and is likely to be of interest to the fuel dispenser user. In some implementations, in response to determining that the first product is present at the second location, the inventory manager 224 can generate an instruction to cause the promotion engine 226 to generate a personalized communication that characterizes a product that complements the first product. And, at 380, the stock out manager 223 can provide the above-described instructions to the promotion engine 226.

In response to receiving the instructions to generate the above-described communications, the promotion engine 226 can generate the above-described communications and, at 390, the communication can be provided to the mobile device 213 of the fuel dispenser user for display on a screen thereof. And, at 395, the communication can be provided to the fuel dispenser 211 for presentation on an interactive display thereof.

Figure 4A:
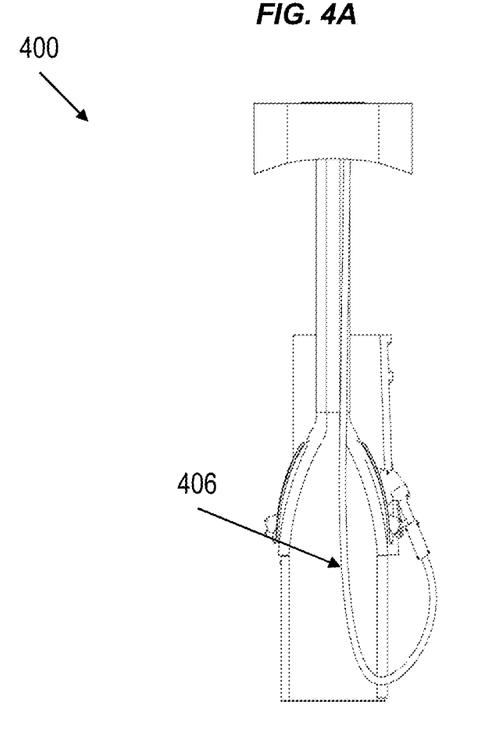
FIG. 4A is a side perspective view of one embodiment of a fuel dispenser.
Figure 4B:
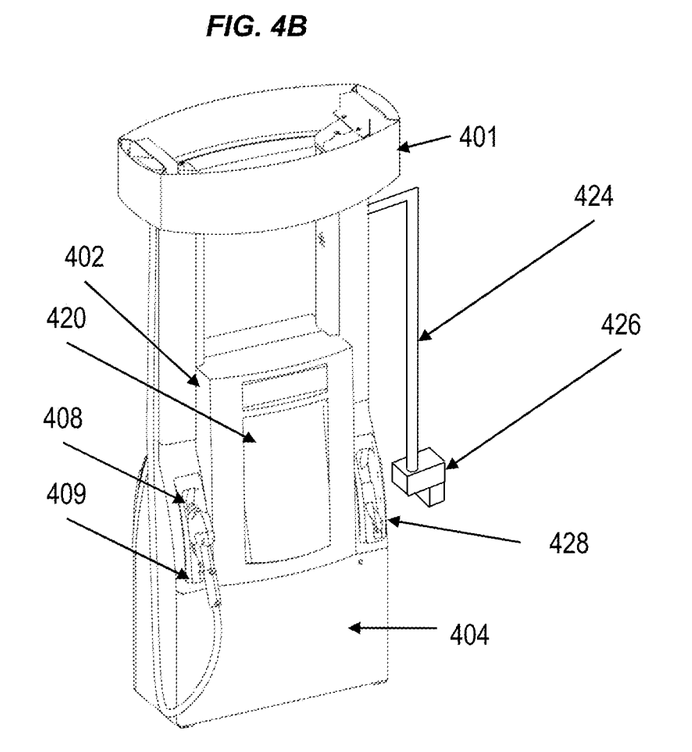
FIG. 4B is a front perspective view of the fuel dispenser shown in FIG. 4A.
Figure 5:
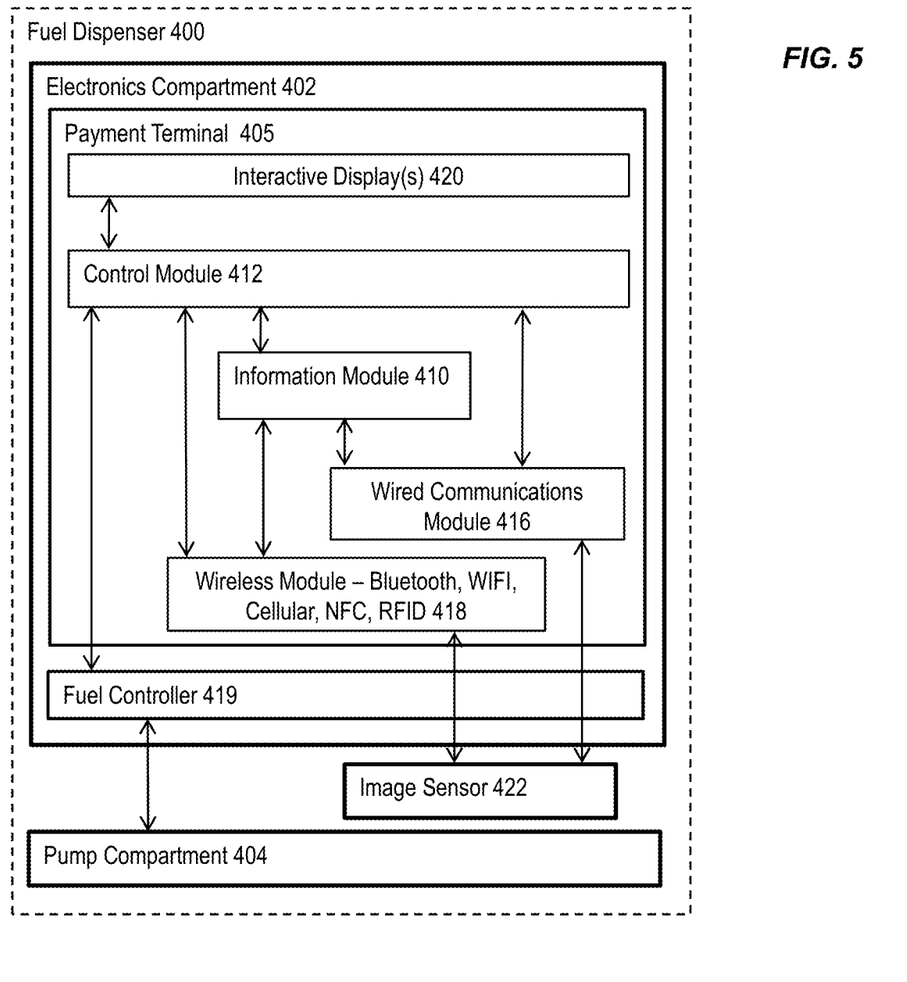
FIG. 5 is a diagram showing internal components of the fuel dispenser of FIGS. 4A and 4B.

FIGS. 4A and 4B illustrate one embodiment of a fuel dispenser 400 that can be used in some implementations of the current subject matter, and FIG. 5 illustrates components of the fuel dispenser. In general, the dispenser 400 includes a dispenser body 401 having an electronics compartment 402, a pump compartment 404, and an image sensor 422. The pump compartment 404 houses a pump configured to pump fuel from a fuel tank or other reservoir, as well as one or more meters that can be configured to monitor fuel flow, flow of fuel additives, and/or flow of other components of the fuel. The pump compartment 404 can also include other components to facilitate fuel dispensing and mixing, such as motors and valves, a strainer/filtering system, a vapor recovery system, and the like. The pump compartment 404 is isolated from the electronics compartment 402 within the dispenser 400 to facilitate safety, security, and/or maintenance, as will be appreciated by a person skilled in the art. Fuel is thus not allowed to flow from the pump compartment 404 to the electronics compartment 402 and instead flows from the pump compartment 404 through hose 406 to a nozzle 408 for dispensing. As will be appreciated by a person skilled in the art, the nozzles 408 are each configured to dispense fuel from the dispenser 400 as pumped therefrom by the pump. The dispenser 400 also includes a nozzle receptacle 409 configured to store the nozzle 408 when not in use.

In some implementations, the dispenser 400 can be configured to dispense electricity and can include several components for dispensing the electricity. For example, dispenser 400 can include a charging cable 424 coupled to the dispenser body 401 at one end and configured to deliver electricity to a charging connector 426 coupled to an opposite end. The charging connector 426 can be configured to couple to a charging port of a vehicle (not shown) and to deliver the electricity provided by the dispenser 400, via the charging cable 424, to the vehicle when coupled to the charging port. When not in use, the charging connector 426 can be stored in a charger receptacle 428 formed on the dispenser body 401.

The electronics compartment 402 houses electronics for facilitating payment for fuel and for facilitating the dispensing of the fuel. For example, the electronics compartment 402 can include a fuel controller 419 that, at least in some implementations, includes a data processor, memory, and storage forming part of at least one computing system. The fuel controller 419 is configured to control dispensing of the fuel from the pump compartment 304. The electronics compartment 402 also includes a payment terminal 405 that is configured to provide a user with one or more options to create a desired fuel mixture, receive instructions characterizing the desired fuel mixture, receive payment information and/or user identification information from a user, transmit and receive the payment information and/or the user identification information with a POS system via a forecourt controller (not shown), and deliver fueling instructions to the fuel controller 419 to dispense fuel. The payment terminal 405 can also be configured to provide a user with information related to a status of fueling. For example, the payment terminal can display an amount of fuel that has been dispensed, and a corresponding fuel cost as the fuel mixture is dispensed.

The payment terminal 405 can be configured to facilitate communication between a user and the fuel controller 419, and can include an interactive display 420 and an information module 410. The information module 410 can, at least in some implementations include a data processor, memory, and storage, forming part of at least one computing system. The payment terminal 405 can also include one or more wired communication modules 416 and/or wireless communication modules 418 and a control module 412 that, at least in some implementations includes a data processor, memory, and storage, forming part of at least one computing system. The communication modules 416, 418 can function to allow data to be transmitted to and from various components within the payment terminal 405 via wired and/or wireless communication, respectively. For example, the communication modules 416, 418 can be configured to transmit and receive signals that can characterize, e.g., payment information, user identification information, and/or information regarding a desired fuel selection, via wired and/or wireless communications, respectively. The wireless communication module 418 can include, e.g., a transceiver for communicating via Bluetooth protocol, cellular protocol, WI-FI protocol, near field communication (NFC), and/or a radio frequency identification (RFID) protocol. Wired and/or wireless communication via the communication modules 416, 418 can be according to any of a variety of communication protocols, e.g., TCP/IP, etc., as will be appreciated by a person skilled in the art. The communication modules 416, 418 are also in operable communication with the image sensor 422 and are configured to receive image data acquired by the image sensor 422. The communication modules 416, 418 can additionally transmit the received image data for further external processing as described elsewhere herein.

The interactive display 420, which can be, or can include, a touchscreen. The interactive display 420 can be operably coupled to the control module 412 which can be used to control, dynamically rearrange, and/or update a graphical user interface (GUI) rendered on the display 420. The display 420 can be configured to show information (e.g., media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 412 to be processed. Some examples of information that the display 420 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select.

To facilitate payment, the information module 410 can be configured to receive input such as, e.g., user identification information and/or payment information, and deliver the information to the control module 412. For example, the information module 410 can include a barcode and/or QR code scanner, and/or a NFC contactless card reader for receiving payment information and/or user identification information.

In some embodiments, the information module 410 be operably coupled to the image sensor 422 for acquiring images of facial features of the user, barcode and/or QR code information (e.g., to scan a loyalty rewards card), vehicle features (e.g., vehicle make, model, color, etc.), license plate number, non-facial body features, and the like, which can be used as user identification information. As another example, the information module 410 can include a palm reader and or/fingerprint reader which can scan a palm and/or finger of the user to obtain user identification information. In some embodiments, the user identification information can be associated with a loyalty rewards identifier automatically. Accordingly, in some embodiments, a pre-determined payment method, and user preferences, can be determined based on user identification information.

As shown in FIG. 5, the information module 410 can be operably coupled to the wired communication module 416 and/or the wireless communication module 418. The wired and wireless communication modules 416, 418 can allow the information module 410 to send and receive payment information and/or user identification information to and from a mobile device such as a smart phone, tablet, laptop, and the like, that is in electronic communication with the information module 410 via the wired and/or wireless communication modules 416, 418. Although the wireless communication module 418 is shown to be located within the payment terminal, the wireless communication module 418 can be located elsewhere on, within, or in the vicinity of, the fuel dispenser 400. For example, the wireless communication module 418 can be mounted on top of the fuel dispenser, which can facilitate retrofitting the wireless communication module 418 to existing fuel dispensers and/or facilitate repair, upgrade, or other maintenance of the communication module 418, as described in U.S. patent application Ser. No. 15/182,201 filed on Jun. 14, 2016 and entitled "Methods and Devices for Fuel Dispenser Electronic Communication."

The subject matter described herein can provide several advantages. By using the functionality and components described above, storefront inventory can be more effectively tailored to customer preferences, resulting in an improved customer experience. In addition, the subject matter described herein can enable improved inventory management by determining recommendations of the goods and/or services presented in the storefront based on electronically-acquired data that characterizes a fueling station customer and by analyzing the electronically-acquired data using predictive modeling techniques to determine goods and/or services of interest to the fueling station customer.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:
    collecting first data using an image sensor of a fuel dispenser at a fueling station, the first data including image data of a fuel dispenser user interacting with the fuel dispenser and a vehicle of the fuel dispenser user, the fuel dispenser including a fuel pump and an interactive display configured to receive a user input to control the fuel pump;
    transmitting the first data to a server, the first data characterizing an attribute of a the fuel dispenser user;
    determining a first product that is associated with the fuel dispenser user using a first predictive model performed by the server that predicts the association of the first product with the fuel dispenser user based on the attribute of the fuel dispenser user;
    collecting second data using a sensor positioned in a first location of a store at the fueling station, the second data characterizing a listing of products stored in the first location;
    transmitting the second data to the server;
    determining third data that characterizes whether the first product is included in the listing of products stored at the first location based on a comparison of the first product to the second data performed by the server;
    determining a first command based on the determined third data using the server; and
    displaying a personalized graphical media characterizing the first product on the interactive display, the personalized graphical media being generated by the server based on the first command.

2. The method of claim 1, wherein the attribute of the fuel dispenser user characterized by the first data includes a history of products purchased by the fuel dispenser user, the history of products including the first product.

3. The method of claim 1, wherein the second data includes image data that characterizes an image of the first location, and wherein the determining of the third data includes determining, from the image data, whether the first product is stored at the first location.

4. The method of claim 1, wherein the third data indicates that the first product is included in the listing of products stored at the first location, and wherein the method further comprises:

determining a first communication, based on the first command, that characterizes a second product, the second product having a complementary association with the first product; and providing the first communication to the fuel dispenser for presentation on the interactive display of the fuel dispenser.

5. The method of claim 4, further comprising:

providing the first communication to a mobile device of the fuel dispenser user for presentation on an interactive display of the mobile device.

6. The method of claim 1, wherein the third data indicates that the first product is not stored at the first location, and wherein the method further comprises:

receiving fourth data characterizing a second location at the fueling station;

determining, based on the first command, the first product, and the received fourth data, fifth data that characterizes whether the first product is stored at the second location;

determining a second command based on the determined fifth data; and transmitting the second command.

7. The method of claim 6, wherein the fifth data indicates that the first product is stored at the second location, and wherein the method further comprises:

determining a notification, based on the transmitted second command, that characterizes a recommendation to relocate the first product from the second location to the first location; and providing the notification to a point-of-sale terminal at the fueling station for presentation on a display thereof.

8. The method of claim 7, further comprising:

providing the notification to a mobile device of a fueling station attendant for presentation on a display thereof.

9. The method of claim 6, wherein the fifth data indicates that the first product is not stored at the second location, and wherein the method further comprises:

determining a second communication, based on the transmitted second command, that characterizes a third product, the third product being an alternative product to the first product; and providing the second communication to the fuel dispenser for presentation on a graphical display of the fuel dispenser.

10. The method of claim 9, further comprising:

providing the second communication to a mobile device of the fuel dispenser user for communication on an interactive display of the mobile device.

11. A system comprising:

at least one data processor; and memory storing instructions configured to cause the at least one data processor to perform operations comprising:

collecting first data using an image sensor of a fuel dispenser at a fueling station, the first data including image data of a fuel dispenser user interacting with the fuel dispenser and a vehicle of the fuel dispenser user, the fuel dispenser including a fuel pump and an interactive display configured to receive a user input to control the fuel pump;

transmitting the first data to a server, the first data characterizing an attribute of the fuel dispenser user;

determining a first product that is associated with the fuel dispenser user using a first predictive model performed by the server that predicts the association of the first product with the fuel dispenser user based on the attribute of the fuel dispenser user;

collecting second data using a sensor positioned in a first location of a store at the fueling station, the second data characterizing a listing of products stored in the first location;

transmitting the second data to the server;

determining third data that characterizes whether the first product is included in the listing of products stored at the first location based on a comparison of the first product to the second data performed by the server;

determining a first command based on the determined third data using the server; and displaying a personalized graphical media characterizing the first product on the interactive display, the personalized graphical media being generated by the server based on the first command.

12. The system of claim 11, wherein the attribute of the fuel dispenser user characterized by the first data includes a history of products purchased by the fuel dispenser user, the history of products including the first product.

13. The system of claim 11, wherein the third data indicates that the first product is included in the listing of products stored at the first location, and wherein the operations further comprise:

determining a first communication, based on the first command, that characterizes a second product, the second product having a complementary association with the first product; and providing the first communication to the fuel dispenser for presentation on the interactive display of the fuel dispenser.

14. The system of claim 11, wherein the third data indicates that the first product is not included in the listing of products stored at the first location, and wherein the operations further comprise:

receiving fourth data characterizing a second location at the fueling station;

determining, based on the first command, the first product, and the received fourth data, fifth data that characterizes whether the first product is stored at the second location;

determining a second command based on the determined fifth data; and transmitting the second command.

15. The system of claim 14, wherein the fifth data indicates that the first product is stored at the second location, and wherein the operations further comprise:

determining a notification, based on the transmitted second command, that characterizes a recommendation to relocate the first product from the second location to the first location; and providing the notification to a point-of-sale terminal at the fueling station for presentation on a display thereof.

16. The system of claim 14, wherein the fifth data indicates that the first product is not stored at the second location, and wherein the operations further comprise:

determining a second communication, based on the transmitted second command, that characterizes a third product, the third product being an alternative product to the first product; and providing the second communication to the fuel dispenser for presentation on a graphical display of the fuel dispenser.

17. A non-transitory computer program product storing instructions which, when executed by at least one data processor forming part of at least one computing system, cause the at least one data processor to implement operations comprising:

collecting first data using an image sensor of a fuel dispenser at a fueling station, the first data including image data of a fuel dispenser user interacting with the fuel dispenser and a vehicle of the fuel dispenser user, the fuel dispenser including a fuel pump and an interactive display configured to receive a user input to control the fuel pump;

transmitting the first data to a server, the first data characterizing an attribute of the fuel dispenser user;

determining a first product that is associated with the fuel dispenser user using a first predictive model performed by the server that predicts the association of the first product with the fuel dispenser user based on the attribute of the fuel dispenser user;

collecting second data using a sensor positioned in a first location of a store at the fueling station, the second data characterizing a listing of products stored in the first location;

transmitting the second data to the server;

determining third data that characterizes whether the first product is included in the listing of products stored at the first location based on a comparison of the first product to the second data performed by the server;

determining a first command based on the determined third data using the server; and displaying a personalized graphical media characterizing the first product on the interactive display, the personalized graphical media being generated by the server based on the first command.

* * * * *